(12) United States Patent
Komori et al.

(10) Patent No.: US 11,480,498 B2
(45) Date of Patent: Oct. 25, 2022

(54) ANGLE DETECTION DEVICE AND ANGLE DETECTION METHOD

(71) Applicant: HITACHI AUTOMOTIVE SYSTEMS, LTD., Hitachinaka (JP)

(72) Inventors: Akihiro Komori, Ibaraki (JP); Eiichiro Ohata, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 202 days.

(21) Appl. No.: 16/966,520

(22) PCT Filed: Feb. 14, 2019

(86) PCT No.: PCT/JP2019/005208
§ 371 (c)(1),
(2) Date: Jul. 31, 2020

(87) PCT Pub. No.: WO2019/187733
PCT Pub. Date: Oct. 3, 2019

(65) Prior Publication Data
US 2021/0033491 A1 Feb. 4, 2021

(30) Foreign Application Priority Data

Mar. 26, 2018 (JP) .............................. JP2018-058307

(51) Int. Cl.
*G01M 15/06* (2006.01)
*G01B 21/22* (2006.01)
*G01D 5/243* (2006.01)

(52) U.S. Cl.
CPC ............. *G01M 15/06* (2013.01); *G01B 21/22* (2013.01); *G01D 5/243* (2013.01)

(58) Field of Classification Search
CPC ....... G01M 15/06; G01B 21/22; G01D 5/243; G01D 5/24485; G01D 18/00; G01D 5/2448
See application file for complete search history.

(56) References Cited

U.S. PATENT DOCUMENTS

| 7,143,518 | B2 | 12/2006 | Watanabe |
| 2005/0168187 | A1 | 8/2005 | Uchiyama |
| 2012/0198909 | A1 | 8/2012 | Buhmann |

FOREIGN PATENT DOCUMENTS

| JP | 2005-168280 A | 6/2005 |
| JP | 2005-348521 A | 12/2005 |

(Continued)

OTHER PUBLICATIONS

Office Action issued in corresponding Japanese Patent Application No. 2020-510383 dated Jan. 5, 2021, with English Machine translation.

(Continued)

*Primary Examiner* — Freddie Kirkland, III
(74) *Attorney, Agent, or Firm* — Foley & Lardner LLP

(57) ABSTRACT

A manufacturing error and a mounting error of a position sensor used for detection of a rotation angle of a rotary shaft are appropriately calibrated to improve detection accuracy of the rotation angle. Therefore, an angle detection device 1 includes at least a first crank angle sensor 1211 and a second crank angle sensor 1212 provided to be capable of detecting a rotation angle of a rotary shaft of a crankshaft 123, and includes: a gain corrector 4 that corrects at least any one of gains G1 and G2 of the first crank angle sensor 1211 and the second crank angle sensor 1212 such that an amplitude ya of a differential signal S41*b* of the first crank angle sensor 1211 is equal to an amplitude yb of a differential signal S42*b* of the second crank angle sensor 1212; and a phase corrector 5 that corrects at least any one of a phase αa of the differential (Continued)

signal S41*b* and a phase αb of the differential signal S42*b* such that the phase αa of the differential signal S41*b* is equal to the phase αb of the differential signal S42*b*.

10 Claims, 8 Drawing Sheets

(56) References Cited

FOREIGN PATENT DOCUMENTS

| | | |
|---|---|---|
| JP | 3826207 B2 | 9/2006 |
| JP | 2008-030897 A | 2/2008 |
| JP | 2010-025830 A | 2/2010 |
| JP | 2015-206614 A | 11/2015 |
| JP | 2015206614 A * | 11/2015 |

OTHER PUBLICATIONS

International Search Report with English translation and Written Opinion issued in corresponding application No. PCT/JP2019/005208 dated Apr. 9, 2019.

* cited by examiner

ANGLE DETECTION DEVICE AND ANGLE DETECTION METHOD

TECHNICAL FIELD

The present invention relates to an angle detection device and an angle detection method.

BACKGROUND ART

In recent years, a technique (lean burn) of performing driving with an air-fuel mixture that is thinner than a stoichiometric air-fuel ratio and a technique (exhaust gas recirculation: EGR) of taking some of an exhaust gas after combustion for intaking again have been developed in order to improve vehicle fuel efficiency and strengthen exhaust gas regulations.

In an internal combustion engine for the purpose of improving the fuel efficiency and strengthening the exhaust gas regulations, combustion sometimes become unstable because the quantities of fuel and air in a combustion chamber deviate from theoretical values, and rotation variations of a crankshaft are detected to determine the combustion stability. Therefore, it is required to accurately detect the rotation angle of the crankshaft. In a general method for detecting the rotation angle of the crankshaft, a rotation angle of a scale plate attached to the crankshaft is read by a crank angle sensor (position sensor) fixed at a predetermined position. In a conventional crank angle sensor, however, a manufacturing error or a mounting error of the crank angle sensor or the scale plate becomes a factor that reduces the detection accuracy of the rotation angle of the crankshaft.

PTL 1 discloses an angle detector that includes a first position sensor and a second position sensor, configured to read a scale plate, around a periphery of the scale plate fastened to a rotary shaft, and performs self-calibration of an angle sensor by determining measurement differences of the individual position sensors and obtaining an average thereof.

CITATION LIST

Patent Literature

PTL 1: Japanese Patent No. 3826207

SUMMARY OF INVENTION

Technical Problem

However, in the angle detector disclosed in PTL 1, it is impossible to calibrate manufacturing errors and mounting errors of the first position sensor and the second position sensor (such as a difference in sensitivity due to individual differences of the respective position sensors), and it is difficult to improve detection accuracy of a rotation angle. As a result, when the angle detector disclosed in PTL 1 is applied to an internal combustion engine, a control device (electronic control unit: ECU) of the internal combustion engine reads a detection signal including the manufacturing errors and the mounting errors of the respective position sensors, so that there is a possibility that combustion stability is erroneously determined in the lean burn or the like where highly accurate angle detection is required.

Therefore, the present invention has been made in view of the above problems, and aims to properly calibrate a manufacturing error and a mounting error of a position sensor used for detection of a rotation angle of a rotary shaft and improve detection accuracy of the rotation angle.

Solution to Problem

In order to solve the above problems, an angle detection device, which detects a rotation angle of a rotary shaft using a first position sensor provided to be capable of detecting the rotation angle of the rotary shaft and a second position sensor provided to be capable of detecting the rotation angle of the rotary shaft at a position different from the first position sensor, includes: a gain corrector that corrects a gain of at least any one of the first position sensor and the second position sensor such that an amplitude of a first output signal of the first position sensor is equal to an amplitude of a second output signal of the second position sensor; and a phase corrector that corrects at least any one of a phase of the first output signal or a phase of the second output signal such that the phase of the first output signal is equal to the phase of the second output signal.

Advantageous Effects of Invention

According to the present invention, it is possible to appropriately calibrate the manufacturing error and the mounting error of the position sensor used for detection of the rotation angle of the rotary shaft, and to improve the detection accuracy of the rotation angle.

DESCRIPTION OF EMBODIMENTS

Hereinafter, embodiments of the present invention will be described by exemplifying a case where an angle detection device 1 is used to detect a rotation angle of a crankshaft 123 included in an internal combustion engine 100.

Internal Combustion Engine

Figure 1:
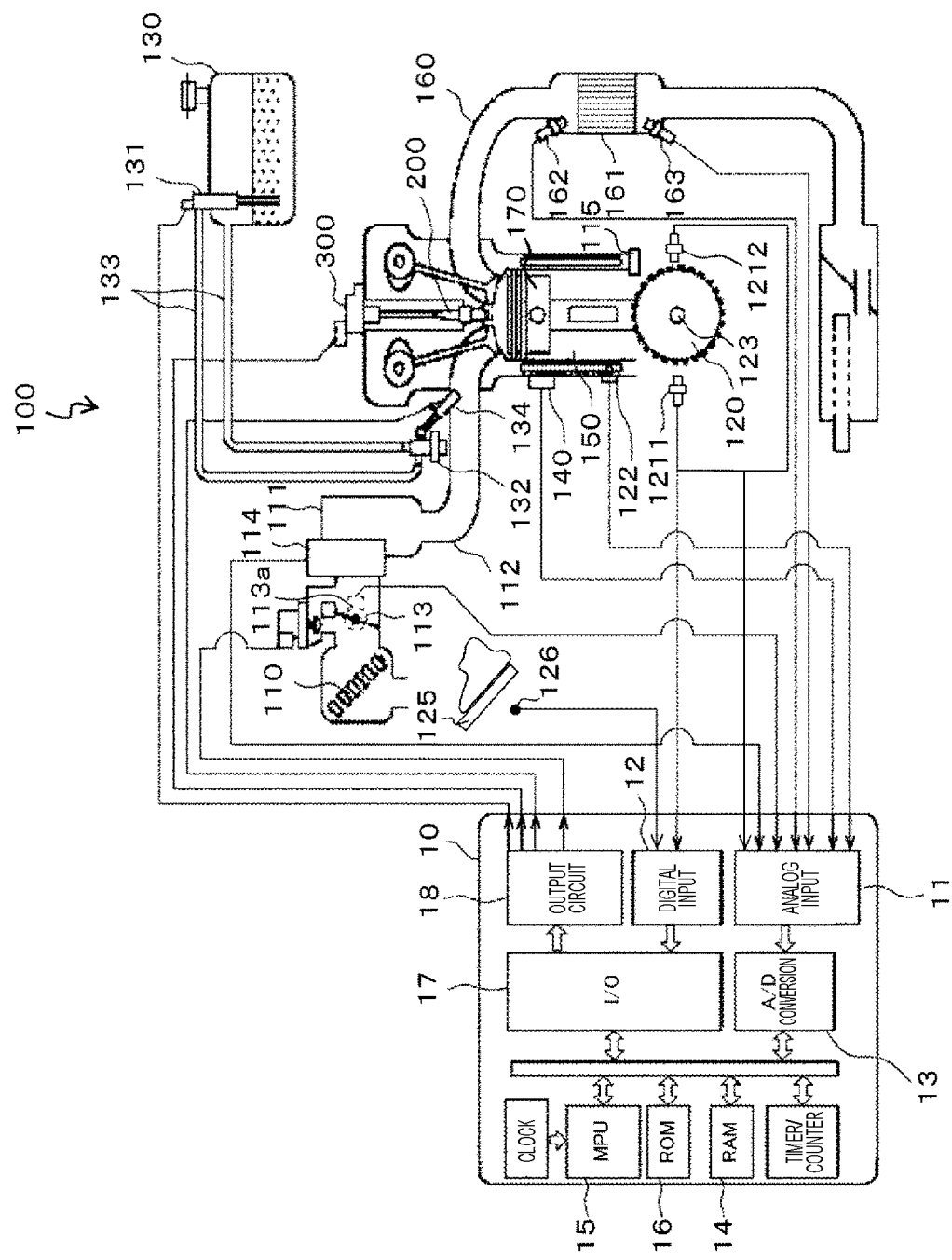
FIG. 1 is a diagram illustrating a main configuration of an internal combustion engine according to an embodiment.

FIG. 1 is a diagram illustrating a main configuration of the internal combustion engine 100 according to an embodiment.

In the internal combustion engine 100, air sucked from the outside flows through an air cleaner 110, an intake pipe 111, and an intake manifold 112, and flows into each of cylinders

150. The amount of air flowing into each of the cylinders 150 is adjusted by a throttle valve 113. The throttle valve 113 is provided with a throttle opening sensor 113a configured to detect a throttle opening, and opening information of the throttle valve 113 detected by the throttle opening sensor 113a is output to a control device (electronic control unit: ECU) 10 together with flow rate information on the amount of air measured by the flow sensor 114. Note that an electronic throttle valve driven by an electric motor is used as the throttle valve 113, but other methods may be used as long as it is possible to appropriately adjust a flow rate of air.

A temperature of the air flowing into each of the cylinders 150 is detected by an intake air temperature sensor 115.

An ignition plug 200 and an ignition coil 300 are provided above each of the cylinders 150. Discharge (ignition) occurs in the ignition plug 200 due to a high voltage supplied from the ignition plug 300 to ignite an air-fuel mixture of air and fuel in the cylinder 150, so that an explosion occurs in the cylinder 150 to push down a piston 170. The piston 170 that has been pushed down causes the crankshaft 123 to rotate.

A ring gear 120 (scale plate) is concentrically attached to the crankshaft 123, and a first crank angle sensor 1211 (first position sensor) and a second crank angle sensor 1212 (second position sensor) are provided on the radially outer side of the ring gear 120 (scale plate) at positions to be symmetrical at 180 degrees about a rotary shaft of the crankshaft 123. The rotation angle of the crankshaft 123 is detected every 10° and every combustion period by the crank angle sensors 1211 and 1212. A first output signal S41 and a second output signal S42 are output from the first crank angle sensor 1211 and the second crank angle sensor 1212, respectively. The first output signal S41 and the second output signal S42 are analog signals. Note that the number and mounting positions of the crank angle sensors are not limited to the above-described embodiment, and various forms, for example, three at 120° intervals or four at 90° intervals around the rotary shaft are conceivable.

A water temperature sensor 122 is provided on a water jacket (not illustrated) of a cylinder head, and the water temperature sensor 122 detects a temperature of cooling water of the internal combustion engine 100.

In addition, a vehicle is provided with an accelerator position sensor (APS) 126 that detects a displacement amount (depressed amount) of an accelerator pedal 125, and the accelerator position sensor 126 detects a request torque of a driver. The request torque of the driver detected by the accelerator position sensor 126 is output to the ECU 10, which will be described later, and the ECU 10 controls the opening of the throttle valve 113 based on the request torque.

Fuel stored in a fuel tank 130 is sucked and pressurized by a fuel pump 131, and then, flows through a fuel pipe 133 provided with a pressure regulator 132 and is guided to a fuel injection valve (injector) 134. The fuel output from the fuel pump 131 is adjusted to a predetermined pressure by the pressure regulator 132, and then, is injected from the fuel injection valve 134 into each of the cylinders 150. As a result of pressure adjustment by the pressure regulator 132, excess fuel is returned to the fuel tank 130 via a return pipe (not illustrated).

The cylinder head (not illustrated) of the internal combustion engine 100 is provided with a combustion pressure sensor (cylinder pressure sensor: CPS, also referred to as an in-cylinder pressure sensor) 140. The combustion pressure sensor 140 is provided in each of the cylinders 150, and detects a pressure (combustion pressure) in the cylinder 150. As the combustion pressure sensor 140, a piezoelectric or gauge pressure sensor is used so as to be capable of detecting the combustion pressure (in-cylinder pressure) in the cylinder 150 over a wide temperature range.

Each of the cylinders 150 is provided with an exhaust manifold 160 that discharges a burned gas (exhaust gas) to the outside of the cylinder 150. A three-way catalyst 161 is provided on the exhaust side of the exhaust manifold 160, and the exhaust gas is purified by the three-way catalyst 161 and then discharged to the atmosphere. An upstream air-fuel ratio sensor 162 is provided on the upstream side of the three-way catalyst 161, and the upstream air-fuel ratio sensor 162 continuously detects an air-fuel ratio of the exhaust gas discharged from each of the cylinders 150. In addition, a downstream air-fuel ratio sensor 163 is provided on the downstream side of the three-way catalyst 161, and the downstream air-fuel ratio sensor 163 outputs a switchable detection signal near a stoichiometric air-fuel ratio. In the embodiment, the downstream air-fuel ratio sensor 163 is an O2 sensor.

Hardware Configuration of ECU

Next, an overall configuration of hardware of the ECU 10 (control device) will be described.

As illustrated in FIG. 1, the ECU 10 includes an analog input unit 11, a digital input unit 12, an analog/digital (A/D) converter 13, a random access memory (RAM) 14, a microprocessing unit (MPU) 15, a read only memory (ROM) 16, an input/output (I/O) port 17, and an output circuit 18.

The analog input unit 11 receives inputs of analog output signals from various sensors such as the first crank angle sensor 1211, the second crank angle sensor 1212, the throttle opening sensor 113a, the flow sensor 114, the accelerator position sensor 126, the upstream air-fuel ratio sensor 162, the downstream air-fuel ratio sensor 163, the combustion pressure sensor 140, and the water temperature sensor 122. The analog output signals from the various sensors input to the analog input unit 11 are subjected to signal processing such as noise removal, and then, are converted into digital signals by the A/D converter 13 and stored in the RAM 14.

An I/O port 17 is connected to the digital input unit 12, and digital output signals input to the digital input unit 12 are stored in the RAM 14 via the I/O port 17.

Each of the output signals stored in the RAM 14 is processed by the MPU 15.

The MPU 15 executes a control program (not illustrated) stored in the ROM 16 to perform arithmetic processing on the output signal stored in the RAM 14 according to the control program. According to the control program, the MPU 15 calculates a control value that defines an operation amount of each actuator that drives the internal combustion engine 100 (for example, the throttle valve 113, the pressure regulator 132, the ignition plug 200, and the like) and temporarily stores the control value in the RAM 14.

The control value defining the operation amount of the actuator stored in the RAM 14 is output to the output circuit 18 via the I/O port 17.

The output circuit 18 has a function of an ignition control unit 183 (see FIG. 2) that controls a voltage applied to the ignition plug 200, and the like.

Functional Configuration of ECU

Next, a functional configuration of the ECU 10 will be described.

Figure 2:
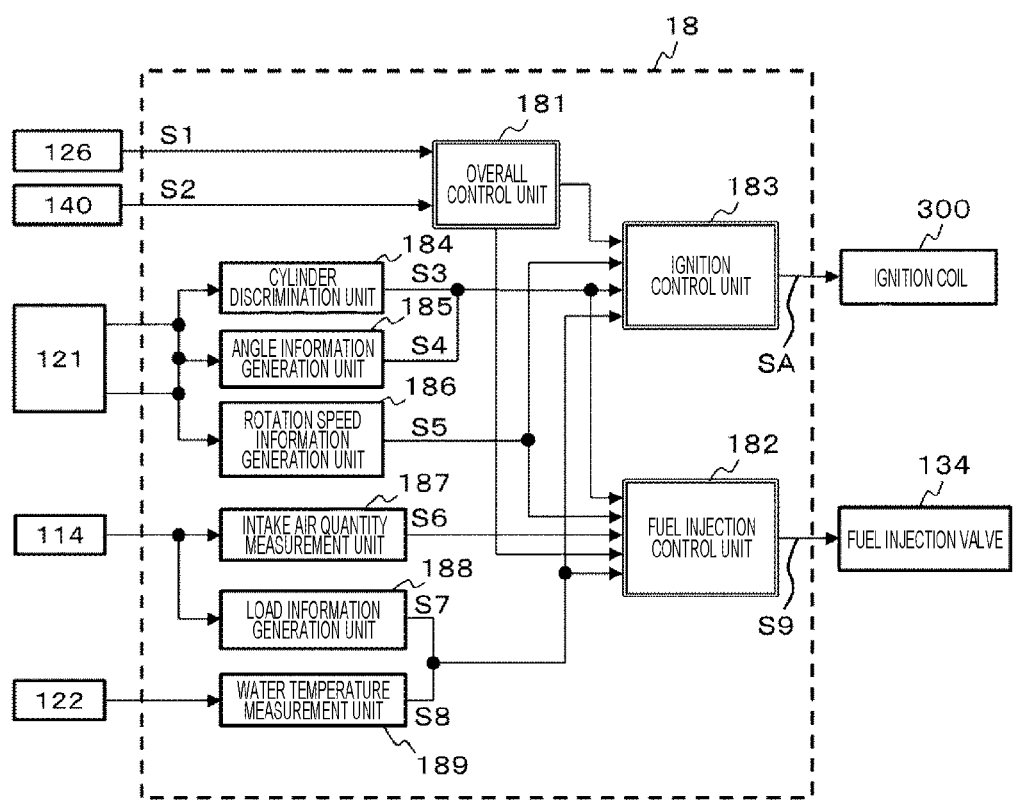
FIG. 2 is a functional block diagram illustrating a functional configuration of a control device.

FIG. 2 is a block diagram illustrating the functional configuration of the ECU 10. Each function of the ECU 10 is implemented by the output circuit 18 when the MPU 15 executes the control program stored in the ROM 16.

As illustrated in FIG. 2, the output circuit 18 of the ECU 10 includes an overall control unit 181, a fuel injection control unit 182, and the ignition control unit 183.

The overall control unit 181 is connected to the accelerator position sensor 126 and the combustion pressure sensor 140 (CPS), and receives the request torque (an acceleration signal S1) from the accelerator position sensor 126 and an output signal S2 from the combustion pressure sensor 140. The overall control unit 181 performs overall control of the fuel injection control unit 182 and the ignition control unit 183 based on the request torque (acceleration signal S1) from the accelerator position sensor 126 and the output signal S2 from the combustion pressure sensor 140.

The fuel injection control unit 182 is connected to a cylinder discrimination unit 184 that discriminates each of the cylinders 150 of the internal combustion engine 100, an angle information generation unit 185 that measures the rotation angle (crank angle) of the crankshaft 123, and a rotation speed information generation unit 186 that measures an engine rotation speed, and receives a cylinder discrimination information S3 from the cylinder discrimination unit 184, crank angle information S4 from the angle information generation unit 185, and engine speed information S5 from the rotation speed information generation unit 186. Note that the angle information generation unit 185 has a configuration that measures a rotation angle (crank angle) of the ring gear 120 (scale plate) using the first crank angle sensor 1211 and the second crank angle sensor 1212, and outputs the first output signal S41 of the first crank angle sensor 1211 and the second output signal S42 of the second crank angle sensor 1212. Note that the first output signal S41 of the first crank angle sensor 1211 and the second output signal S42 of the second crank angle sensor 1212 configure the crank angle information S4.

In addition, the fuel injection control unit 182 is connected to an intake air quantity measurement unit 187 that measures the quantity of intake air of air taken into the cylinder 150, a load information generation unit 188 that measures an engine load, and a water temperature measurement unit 189 that measures a temperature of engine cooling water, and receives intake air quantity information S6 from the intake air quantity measurement unit 187, engine load information S7 from the load information generation unit 188, and cooling water temperature information S8 from the water temperature measurement unit 189.

The fuel injection control unit 182 calculates an injection amount and an injection time (fuel injection valve control information S9) of fuel injected from the fuel injection valve 134 based on the respective pieces of received information, and controls the fuel injection valve 134 based on the calculated injection amount and injection time of fuel.

The ignition control unit 183 is connected to not only the overall control unit 181 but also the cylinder discrimination unit 184, the angle information generation unit 185, the rotation speed information generation unit 186, the load information generation unit 188, and the water temperature measurement unit 189, and receives each information from these units.

The ignition control unit 183 calculates the amount of current (an energization angle) for energizing the ignition coil 300, and calculates an energization start time and a time for interrupting the energized current (ignition time) based on the respective pieces of received information. The ignition control unit 183 controls the ignition of the ignition plug 200 by outputting an ignition signal SA to the ignition coil 300 based on the calculated energization amount, energization start time, and ignition time. The ignition control unit 183 detects whether or not the air-fuel mixture in the cylinder 150 is ignited by the ignition of the ignition plug 200 based on an in-cylinder pressure and an in-cylinder volume of the cylinder 150.

Angle Detection Device

Next, the angle detection device 1 according to the embodiment of the present invention will be described.

Figure 3:
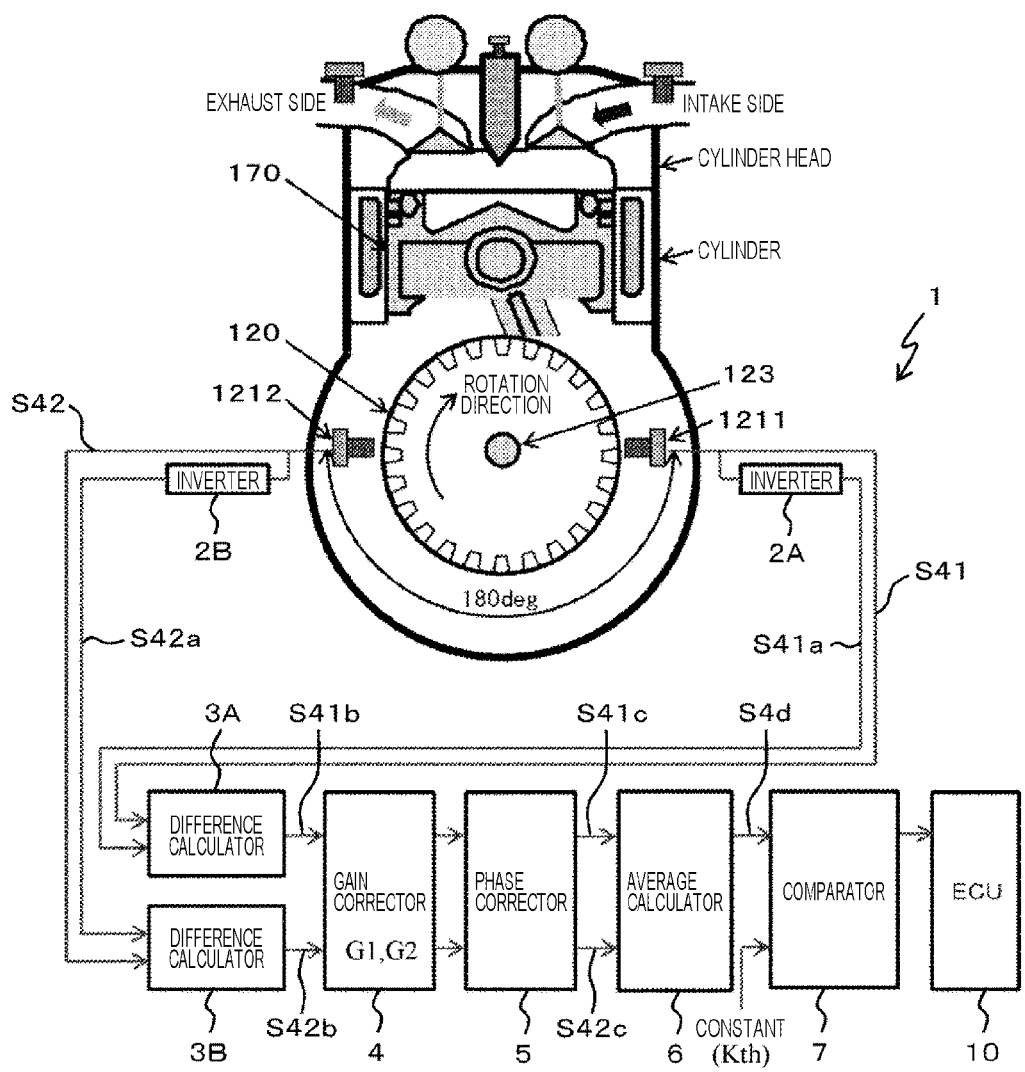
FIG. 3 is a functional block diagram illustrating a functional configuration of an angle detection device.

FIG. 3 is a functional block diagram illustrating a functional configuration of the angle detection device 1 according to the embodiment.

Figure 4:
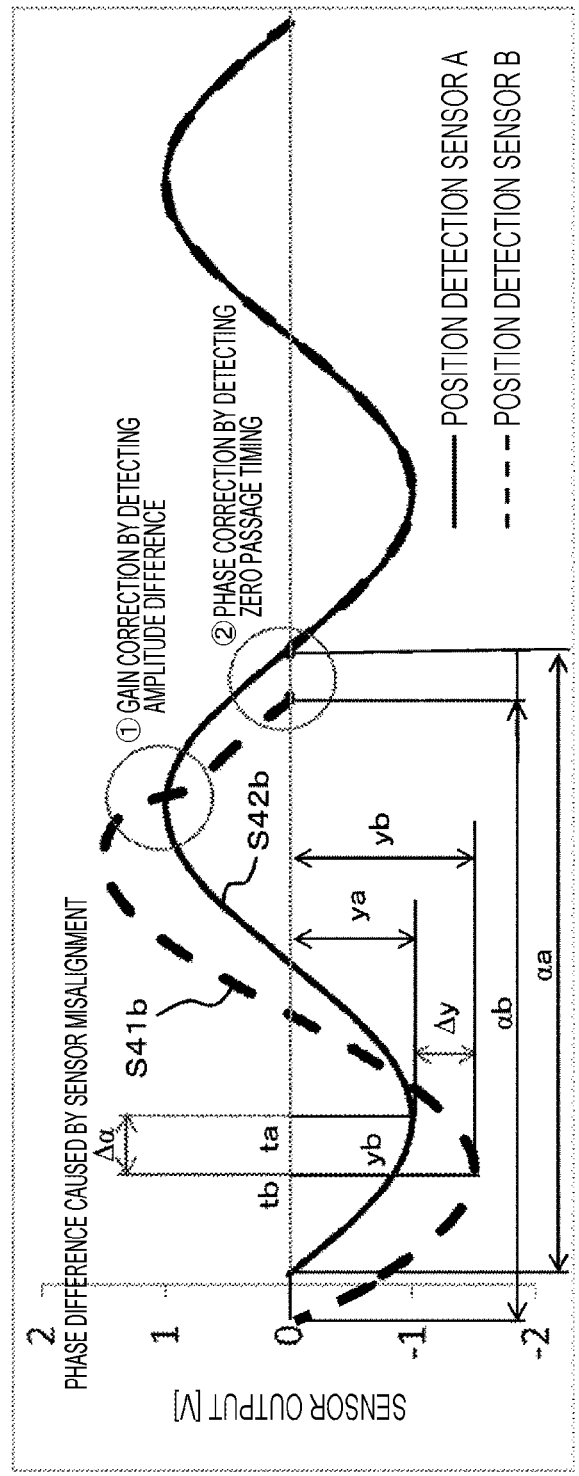
FIG. 4 is a view illustrating a method for correcting a gain using a gain corrector and a method for correcting a phase using a phase corrector.

FIG. 4 is a view illustrating a method for correcting a gain using a gain corrector 4 and a method for correcting a phase using a phase corrector 5.

As illustrated in FIG. 3, the angle detection device includes the first crank angle sensor 1211, the second crank angle sensor 1212, inverters 2A and 2B, difference calculators 3A and 3B, the gain corrector 4, the phase corrector 5, an average calculator 6, and a comparator 7. Note that the inverter 2A and the inverter 2B are imply referred to as an inverter 2 unless particularly distinguished, and the difference calculator 3A and the difference calculator 3B are simply referred to as a difference calculator 3 unless particularly distinguished.

As described above, the first crank angle sensor 1211 and the second crank angle sensor 1212 are arranged on the radially outer side of the ring gear 120 provided on the crankshaft 123 at the positions to be symmetrical at 180 degrees about the rotary shaft of the crankshaft 123. The first crank angle sensor 1211 and the second crank angle sensor 1212 detect a convex portion (or a concave portion) formed continuously over the entire circumference in the circumferential direction around the rotation axis of the ring gear 120 to detect the rotation angle of the crankshaft 123 around the rotary shaft. The first output signal S41 corresponding to the rotation angle of the crankshaft 123 detected by the first crank angle sensor 1211 is output to the difference calculator 3A and the inverter 2A, and the second output signal S42 corresponding to the rotation angle of the crankshaft 123 detected by the second crank angle sensor 1212 is output to the difference calculator 3B and the inverter 2B.

The inverter 2A outputs a voltage signal S41a obtained by inverting the first output signal S41 output from the first crank angle sensor 1211, and the inverter 2B outputs a voltage signal S42a obtained by inverting the second output signal S42 output from the second crank angle sensor 1212. For example, when inversion reference voltages of the inverters 2A and 2B are set to 2 V, and voltages of 3 V (the first output signal S41 and the second output signal S42) are input respectively from the crank angle sensors 1211 and 1212, inversion results in the inverters 2A and 2B become 1 V, and the voltage signals S41a and S42a of 1 V are output to the difference calculators 3A and 3B.

The difference calculator 3A calculates a difference (S41a−S41) between the first output signal S41 from the first crank angle sensor 1211 and the voltage signal S41a from the inverter 2A, the difference calculator 3B calculates a difference (S42a−S42) between the second output signal S42 from the second crank angle sensor 1212 and the voltage signal S42a from the inverter 2B, and calculated differential signals S41b and S42b are output to the gain corrector 4.

As illustrated in FIG. 4, the gain corrector 4 compares the differential signal S41b based on the first output signal S41 of the first crank angle sensor 1211 and the differential signal S42*b* based on the second output signal S42 of the second crank angle sensor 1212, calculates an amplitude difference Δy (yb−ya) between the differential signals S41*b* and S42*b* at timings ta and tb when absolute values of the differential signals S41*b* and S42*b* of the respective crank angle sensors 1211 and 1212 have the maximum values, and corrects a gain G2 of the second crank angle sensor 1212 such that the maximum value of the amplitude of the differential signal S42*b* of the second crank angle sensor 1212 is equal to the maximum value of the amplitude of the differential signal S41*b* of the first crank angle sensor 1211. In the embodiment, the amplitude yb of the differential signal S42*b* of the second crank angle sensor 1212 is larger than the amplitude ya of the differential signal S41*b* of the first crank angle sensor 1211, and thus, the gain G2 of the second crank angle sensor 1212 is reduced to perform the correction such that the maximum value of the amplitude of the differential signal S42*b* of the second crank angle sensor 1212 is equal to the maximum value of the amplitude of the differential signal S41*b* of the first crank angle sensor 1211. Note that the gain corrector 4 may correct a gain G1 of the first crank angle sensor 1211 such that the maximum value of the amplitude of the differential signal S41*b* of the first crank angle sensor 1211 is equal to the maximum value of the amplitude of the differential signal S42*b* of the second crank angle sensor 1212.

The phase corrector 5 stores the differential signals S41*b* and S42*b* of the first crank angle sensor 1211 and the second crank angle sensor 1212 in the RAM 14 of the ECU 10 at fixed time intervals, calculates a phase difference Δα (αb−αa) between the differential signals S41*b* and 42*b* at a timing when the differential signal S41*b* of the first crank angle sensor 1211 is 0 (zero) as illustrated in FIG. 4, and corrects a phase of the differential signal S42*b* of the second crank angle sensor 1212 such that the phase αb of the differential signal S42*b* of the second crank angle sensor 1212 is equal to the phase αa of the differential signal S41*b* of the first crank angle sensor 1211 at the timing. As a result, it is possible to correct the phase of the differential signal S42*b* of the second crank angle sensor 1212 to match the phase of the differential signal S41*b* of the first crank angle sensor 1211. Note that the phase difference Δα (αb−αa) between the differential signals S41*b* and 42*b* may be calculated at a timing when the differential signal S42*b* of the second crank angle sensor 1212 is 0 (zero), and the phase of the differential signal S41*b* of the first crank angle sensor 1211 may be corrected such that the phase αa of the differential signal S41*b* of the first crank angle sensor 1211 is equal to the phase αb of the differential signal S42*b* of the second crank angle sensor 1212 at the timing. Corrected differential signals S41*c* and 42*c* are output to the average calculator 6.

Returning to FIG. 3, the average calculator 6 divides the sum of the corrected differential signals S41*c* and S42*c* by two to calculate a voltage signal S4*d* which is an average value of the corrected differential signals S41*c* and S42*c*. As a result, it is possible to calibrate manufacturing errors and mounting errors of the first crank angle sensor 1211 and the second crank angle sensor 1212, and the voltage signal S4*d* after the calibration is output to the comparator 7.

In the comparator 7, a predetermined threshold (constant) Kth is set in advance, outputs an LO voltage (for example, 0 V), which is a predetermined voltage value, when the voltage signal S4*d* is lower than the threshold Kth (S4*d*<Kth) as a result of comparing the voltage signal S4*d* input from the average calculator 6 and the threshold Kth, and outputs an HI voltage (for example, 5 V), which is a predetermined voltage value, when the voltage signal S4*d* is equal to or higher than the threshold Kth (S4*d*≥Kth). A voltage signal S4*e* output from the comparator 7 has the same form as that of a conventional case having the single crank angle sensor. For this reason, no change is required on the ECU 10 side that receives the voltage signal S4*e*, and it is possible to reduce an angle error including the manufacturing errors and mounting errors of the crank angle sensors 1211 and 1212.

Angle Detection Method

Next, a method for detecting an angle of the crankshaft 123 using the above-described angle detection device 1 will be described.

Figure 5:
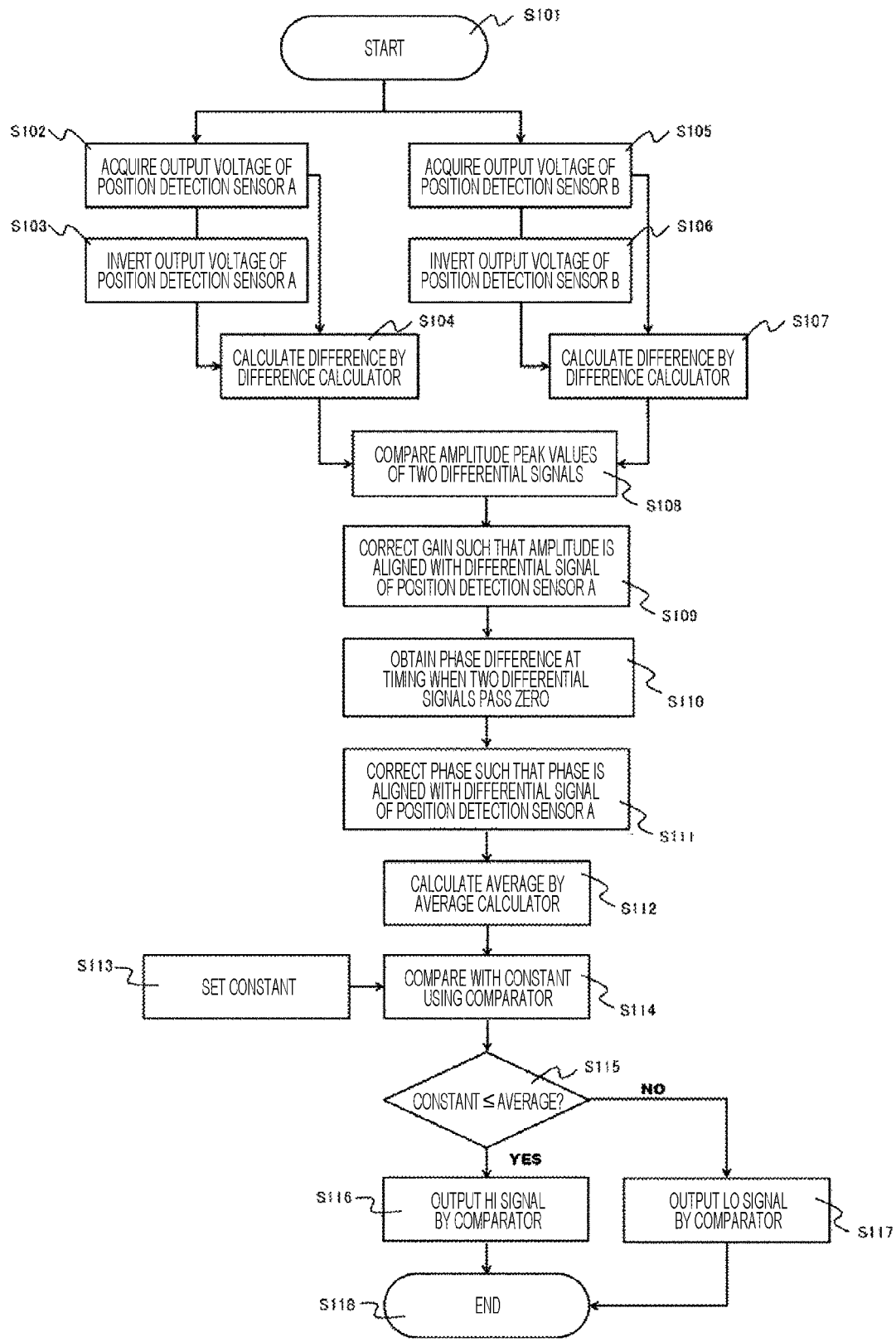
FIG. 5 is a flowchart of a method for detecting an angle of a crankshaft using the angle detection device.

FIG. 5 is a flowchart of the method for detecting the angle of the crankshaft 123 using the angle detection device 1 according to the embodiment.

In Step S101, the angle detection device 1 starts a process of detecting the angle of the crankshaft 123 when the power of the internal combustion engine 100 is turned on (for example, an ignition switch of the vehicle is turned on).

In Step S102, the first crank angle sensor 1211 detects a distance between the first crank angle sensor 1211 and the convex portion (or the concave portion) of the ring gear 120, and outputs the first output signal S41 corresponding to the detected distance to the inverter 2A and the difference calculator 3A.

In Step S103, the inverter 2A inverts the first output signal S41 input from the first crank angle sensor 1211 using the preset inversion reference voltage (2 V in the embodiment) as the center, and outputs the inverted voltage signal S41*a* (1 V in the embodiment) to the difference calculator 3A.

In Step S104, the difference calculator 3A calculates a difference (S41−S41*a*) between the first output signal S41 from the first crank angle sensor 1211 and the voltage signal S41*a* after being inverted by the inverter 2A, and outputs the calculated differential signal S41*b* to the gain corrector 4.

In Step S105, the second crank angle sensor 1212 detects a distance between the second crank angle sensor 1212 and the convex portion (or the concave portion) of the ring gear 120, and outputs the second output signal S42 corresponding to the detected distance to the inverter 2B and the difference calculator 3B.

In Step S106, the inverter 2B inverts the second output signal S42 input from the second crank angle sensor 1212 using the preset inversion reference voltage (2 V in the embodiment) as the center, and outputs the inverted voltage signal S42*a* (1 V in the embodiment) to the difference calculator 3B.

In Step S107, the difference calculator 3B calculates a difference (S42−S42*a*) between the second output signal S42 from the second crank angle sensor 1212 and the voltage signal S42*a* after being inverted by the inverter 2B, and outputs the calculated differential signal S42*b* to the gain corrector 4.

In Step S108, the gain corrector 4 compares the differential signal S41*b* of the first crank angle sensor 1211 and the differential signal S42*b* of the second crank angle sensor 1212. In the embodiment, the gain corrector 4 calculates the amplitude difference Δy (yb−ya) between the amplitude ya of the differential signal S41*b* and the amplitude yb of the differential signal S42*b* at the timing when the differential signal S41*b* of the first crank angle sensor 1211 has the maximum value.

In Step S109, the gain corrector 4 corrects the gain G2 of the second crank angle sensor 1212 such that the maximum value of the differential signal S42b of the second crank angle sensor 1212 is equal to the maximum value of the differential signal S41b of the first crank angle sensor 1211 (such that the amplitude difference Δy is 0) at the timing of Step S108.

In Step S110, the phase corrector 5 calculates the phase difference Δα (αb−αa) between the phase αa of the differential signal S41b and the phase αb of the differential signal S42b at the timing when the differential signal S41b of the first crank angle sensor 1211 is 0 (zero).

In Step S111, the phase corrector 5 corrects the phase of the differential signal S42b of the second crank angle sensor 1212 such that the timing when the differential signal S42b of the second crank angle sensor 1212 is 0 (zero) is equal to the timing when the differential signal S41b of the first crank angle sensor 1211 is 0 (zero) (such that the phase difference Δα is 0).

In Step S112, the average calculator 6 calculates the average value S4d by dividing the sum of the voltage values of the corrected differential signal S41c of the first crank angle sensor 1211 and the corrected differential signal S42c of the second crank angle sensor 1212 by two. As a result, the calibration of the angle error including the manufacturing errors and mounting errors of the crank angle sensors 1211 and 1212 is completed.

In Step S113, the predetermined threshold (constant) Kth is set in the comparator in advance.

In Step S114, the comparator 7 compares the threshold (constant) Kth set in Step S113 and the voltage signal S4d calculated by the average calculator 6.

In Step S115, the comparator 7 proceeds to Step S116 when the voltage signal S4d calculated by the average calculator 6 is equal to or higher than the threshold (constant) Kth (Step S115: YES), and proceeds to Step S117 when the voltage signal S4d is lower than the threshold (constant) (Step S115: NO).

In Step S116, the comparator 7 outputs the HI voltage (5 V in the embodiment), which is the preset voltage value, to the ECU 10 when the voltage signal S4d calculated by the average calculator 6 is equal to or higher than the threshold (constant) Kth, and ends the process (Step S118).

In Step S117, the comparator 7 outputs the LO voltage (0 V in the embodiment), which is the preset voltage value, to the ECU 10 when the voltage signal S4d calculated by the average calculator 6 is lower than the threshold (constant), and ends the process (Step S118).

In Step S118, the ECU 10 continuously executes the above-described processing in Steps S101 to S117 at a predetermined period until the power of the internal combustion engine 100 is turned off (the ignition switch of the vehicle is turned off).

As described above, in the above-described embodiment, (1) the angle detection device 1, which detects the rotation angle of the rotary shaft using the first crank angle sensor 1211 (first position sensor) provided to be capable of detecting the rotation angle of the rotary shaft and the second crank angle sensor 1212 (second position sensor) provided to be capable of detecting the rotation angle of the rotary shaft at a position different from the first crank angle sensor 1211, includes: the gain corrector 4 that corrects at least any one of the gains G1 and G2 of the first crank angle sensor 1211 and the second crank angle sensor 1212 such that the amplitude ya of the differential signal S41b based on the first output signal S41 of the first crank angle sensor 1211 is equal to the amplitude yb of the differential signal S42b based on the second output signal S42 of the second crank angle sensor 1212; and the phase corrector 5 that corrects at least any one of the phase αa of the differential signal S41b and the phase αb of the differential signal S42b such that the phase αa of the differential signal S41b is equal to the phase αb of the differential signal S42b.

With this configuration, in the angle detection device 1, at least any one of the gains G1 and G2 of the first crank angle sensor 1211 and the second crank angle sensor 1212 is corrected such that the amplitudes of at least two different signals of the differential signal S41b based on the first output signal S41 of the first crank angle sensors 1211 and the differential signal S42b based on the second output signal S42 of the second crank angle sensor 1212 are equal, and the phase of any output signal is corrected such that the phase αa of the differential signal S41b is equal to the phase αb of the differential signal S42b. Thus, the calibration of the manufacturing errors and mounting errors of the first crank angle sensor 1211 and the second crank angle sensor 1212 can be appropriately performed, and the detection accuracy of the rotation angle can be improved. Furthermore, the voltage signal finally output has the same form as that of the conventional crank angle sensor, and thus, no change is required on the ECU 10 side, and the angle error can be reduced.

(2) In addition, the gain corrector 4 is configured to correct at least any one of the gains G1 and G2 of the first crank angle sensor 1211 and the second crank angle sensor 1212 such that the amplitude ya of the differential signal S41b is equal to the amplitude yb of the differential signal S42b at the timing when any one of the amplitude ya of the differential signal S41b of the first crank angle sensor 1211 and the amplitude yb of the differential signal S42b of the second crank angle sensor 1212 has the maximum value.

With this configuration, the gain corrector 4 corrects the amplitudes ya and yb at the timing when the amplitudes ya and yb of the differential signals S41b and S42b reach the maximum values, and thus, it is easy to perform the correction that makes the maximum values of the amplitude ya of the differential signal S41b and the amplitude yb of the differential signal S42b equal.

(3) In addition, the phase corrector 5 is configured to calculate the phase difference Δα between the phase αa of the differential signal S41b and the phase αb of the differential signal S42b at the timing when any one of the differential signal S41b and the differential signal S42b becomes zero and to correct at least any one of the phases αa and αb of the differential signal S41b and the differential signal S42b such that the timing when the differential signal S41b becomes zero is equal to the timing when the differential signal S42b becomes zero.

With this configuration, the phase corrector 5 corrects the phases αa and αb at the timing when the differential signals S41b and S42b become 0 (zero), and thus, it is easy to perform the correction that makes the phase αa of the differential signal S41b and the phase αb of the differential signal S42b equal.

(4) In addition, the angle detection device 1 includes: the inverters 2A and 2B that invert and output the first output signal S41 and the second output signal S42, respectively; and the difference calculators 3A and 3B that calculate the difference between the output signals before and after the inversion of the first output signal S41 and the difference between the output signals before and after the inversion of the second output signal S42 which are obtained by the inverters 2A and 2B.

With this configuration, the difference between the output signals before and after the inversion of the first crank angle sensor 1211 and the second crank angle sensor 1212 is obtained, and thus, noises of the differential signals S41$b$ and S42$b$ after obtaining the difference are reduced, and the subsequent gain correction and phase correction can be performed accurately.

(5) In addition, the angle detection device 1 includes: the average calculator 6 that calculates the voltage signal S4$d$ as the average value of the corrected output signal S41$c$ of the first output signal S41 and the corrected output signal S42$c$ of the second output signal S42, which are obtained by the phase corrector 5; and the comparator 7 that compares the voltage signal S4$d$, which is the average value calculated by the average calculator 6, and the predetermined threshold Kth and outputs the comparison result to the ECU 10.

With this configuration, it is possible to convert the analog voltage signal S4$d$ after performing the gain correction and the phase correction into the digital signal of the HI voltage (5 V in the embodiment) or the LO voltage (0 V in the embodiment) based on the threshold Kth, and the voltage signal after the calibration of the gain and the phase, which has been converted into the digital signal, can be output to the ECU 10. The ECU 10 can accurately acquire rotational fluctuations of the crankshaft 123 based on the calibrated voltage signal indicating the rotational angle, and as a result, can accurately determine the combustion stability. Therefore, the ECU 10 can appropriately adjust the combustion stability by performing control to increase or decrease the amount of fuel using the fuel injection valve 134, control of the quantity of intake air using the throttle valve 113, and control of the ignition timing with the ignition plug 200 in accordance with the determination of the combustion stability.

Note that the description has been given in the above-described embodiment by exemplifying the case where the angle detection device 1 includes the gain corrector 4 and the phase corrector 5, but it may be configured to include at least any one of the gain corrector 4 and the phase corrector 5. Specifically, the angle detection device 1, which detects a rotation angle of a rotary shaft using the first crank angle sensor 1211 (first position sensor) provided to be capable of detecting the rotation angle of the rotary shaft and the second crank angle sensor 1212 (second position sensor) provided to be capable of detecting the rotation angle of the rotary shaft at a position different from the first crank angle sensor 1211, may be configured to include: the gain corrector 4 that corrects at least any one of the gains G1 and G2 of the first crank angle sensor 1211 and the second crank angle sensor 1212 such that the amplitude ya of the differential signal S41$b$ based on the first output signal S41 of the first crank angle sensor 1211 is equal to the amplitude yb of the differential signal S42$b$ based on the second output signal S42 of the second crank angle sensor 1212. Alternatively, the angle detection device 1, which detects a rotation angle of a rotary shaft using the first crank angle sensor 1211 (first position sensor) provided to be capable of detecting the rotation angle of the rotary shaft and the second crank angle sensor 1212 (second position sensor) provided to be capable of detecting the rotation angle of the rotary shaft at a position different from the first crank angle sensor 1211, may be configured to include: the phase corrector 5 that corrects at least any one of the phase α$a$ of the differential signal S41$b$ and the phase α$b$ of the differential signal S42$b$ such that the phase α$a$ of the differential signal S41$b$ based on the first output signal S41 of the first crank angle sensor 1211 is equal to the phase α$b$ of the differential signal S42$b$ based on the second output signal S42 of the second crank angle sensor 1212. Even with this configuration, the same operations and effects as those of the above-described configuration can be obtained.

Second Embodiment

Next, an angle detection device 1A according to a second embodiment of the present invention will be described.

In the above-described embodiment, the description has been given by exemplifying the case of performing the correction based on the differential signal S41$b$ of the first crank angle sensor 1211 in the gain corrector 4 and the phase corrector 5. However, when the differential signal S41$b$ includes a high noise, the gain correction and phase correction are performed in a state where the noise is included, and the resultant is input to the ECU 10. In this case, the ECU 10 detects a rotation angle of the crankshaft 123 based on the output signal including the noise, so that there is a high possibility that the rotation angle is not detected accurately. Therefore, it is difficult for the ECU 10 to accurately determine the combustion stability, and as a result, it is difficult to appropriately improve the fuel efficiency and reduce a fuel gas. Therefore, the angle detection device 1A according to the second embodiment can measure noises of a differential voltage S41$b$ of the first crank angle sensor 1211 and a differential voltage S42$b$ of the second crank angle sensor 1212 and reduce the influence of the noises using the crank angle sensor having the lower noise as the reference, which is a difference from the above-described embodiment.

The angle detection device 1A has a noise measuring device (not illustrated) that measures the noise of the differential signals S41$b$ and S42$b$ generated by the difference calculators 3A and 3B, and the ECU 10 determines which of the noise of the differential signal S41$b$ and the noise of the differential signal S42$b$ measured by the noise measuring device (not illustrated) is higher. In the second embodiment to be described hereinafter, a description will be given by exemplifying a case where the ECU 10 determines that the noise of the differential signal S41$b$ of the first crank angle sensor 1211 between the noises measured by the noise measuring device (not illustrated) is higher than the noise of the differential signal S42$b$ of the second crank angle sensor 1212.

Figure 6:
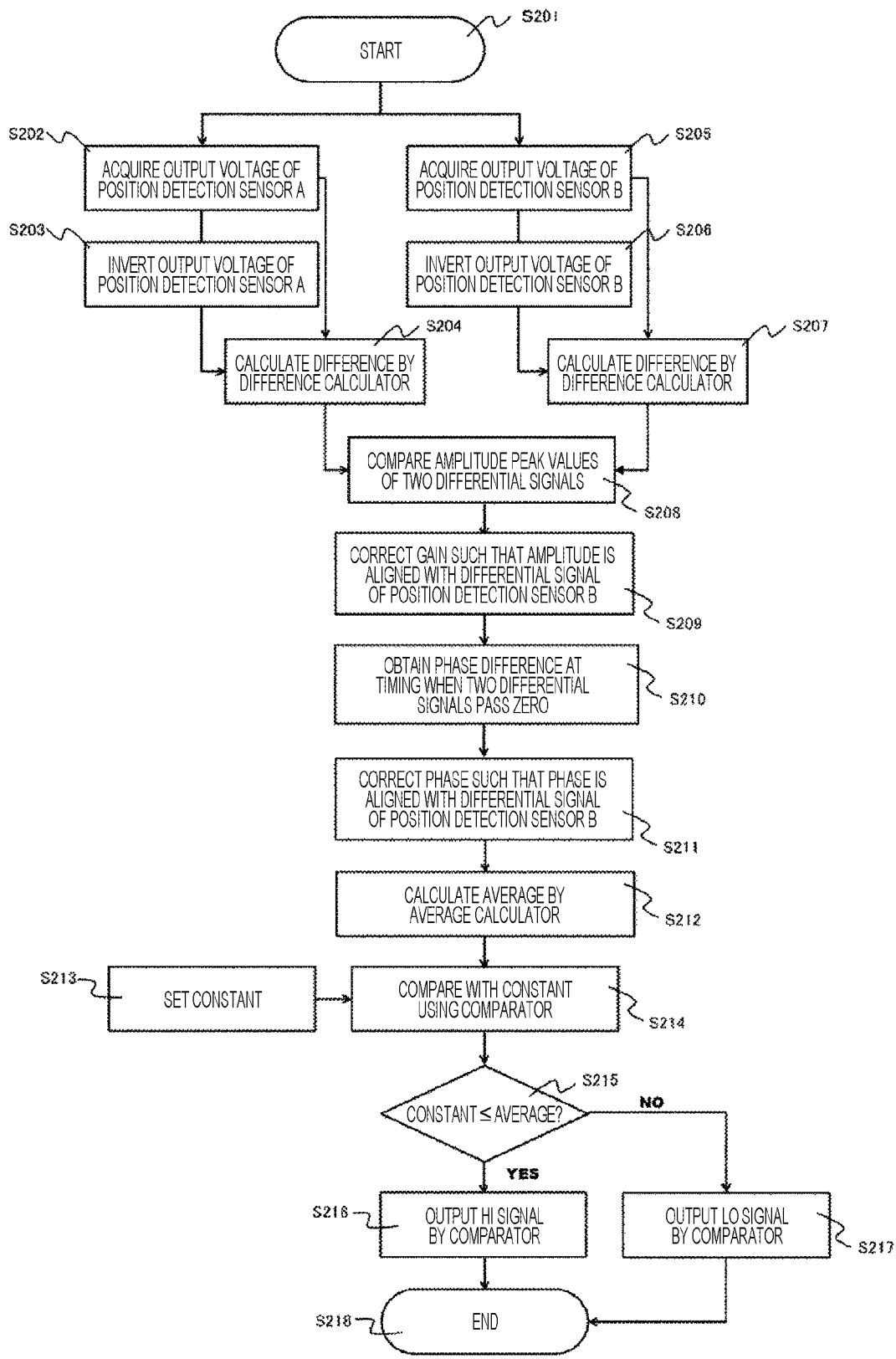
FIG. 6 is a flowchart of a method for detecting an angle of a crankshaft using an angle detection device according to a second embodiment.

FIG. 6 is a flowchart of a method for detecting an angle of the crankshaft 123 using the angle detection device 1A according to the second embodiment. Note that the same configurations as those in the above-described embodiment are denoted by the same reference signs, and will be described as needed.

As illustrated in FIG. 6, Steps S201 to S207 are the same procedures as Steps S101 to S107 described above.

In Step S208, the ECU 10 determines which differential voltage has the higher noise between the noise of the differential voltage S41$b$ of the first crank angle sensor 1211 and the noise of the differential voltage S42$b$ of the second crank angle sensor 1212 measured by the noise measuring device (not illustrated). In the embodiment, it is determined that the noise of the differential voltage S41$b$ is higher than the noise of the differential voltage S42$b$.

In addition, in Step S208, the gain corrector 4 compares the differential signal S41$b$ of the first crank angle sensor 1211 and the differential signal S42$b$ of the second crank angle sensor 1212. In the embodiment, the gain corrector 4 calculates the amplitude difference Δy (yb−ya) between the amplitude ya of the differential signal S41$b$ and the amplitude yb of S42b at the timing when the differential signal S41b of the first crank angle sensor 1211 has the maximum value.

In Step S209, the gain corrector 4 corrects the gain G1 of the first crank angle sensor 1211 such that the maximum value of the differential signal S41b of the first crank angle sensor 1211 is equal to the maximum value of the differential signal S42b of the second crank angle sensor 1212 at the timing of Step S208.

In Step S210, the phase corrector 5 calculates the phase difference Δα (αb−αa) between the phase αa of the differential signal S41b and the phase αb of the differential signal S42b at a timing when the differential signal S41b of the first crank angle sensor 1211 is 0 (zero).

In Step S211, the phase corrector 5 corrects the phase of the differential signal S41b of the first crank angle sensor 1211 such that a timing when the differential signal S41b of the first crank angle sensor 1211 becomes 0 (zero) is equal to a timing when the differential signal S42b of the second crank angle sensor 1212 becomes 0 (zero).

In Step S212, the average calculator 6 calculates an average value by dividing the sum of voltage values of the corrected differential signal S41c of the first crank angle sensor 1211 and the corrected differential signal 42c of the second crank angle sensor 1212 by two. As a result, the calibration of the angle error including the manufacturing errors and mounting errors of the crank angle sensors 1211 and 1212 is completed.

In Step S213, the predetermined threshold (constant) Kth is set in the comparator in advance.

In Step S214, the comparator 7 compares the threshold (constant) Kth set in Step S213 and the voltage signal S4d calculated by the average calculator 6.

In Step S215, the comparator 7 proceeds to Step S216 when the voltage signal S4d calculated by the average calculator 6 is equal to or higher than the threshold (constant) Kth (Step S215: YES), and proceeds to Step S217 when the voltage signal S4d is lower than the threshold (constant) (Step S215: NO).

In Step S216, the comparator 7 outputs an HI voltage (5 V in the embodiment), which is the preset voltage value, to the ECU 10 when the voltage signal S4d calculated by the average calculator 6 is equal to or higher than the threshold (constant) Kth, and ends the process (Step S218).

In Step S217, the comparator 7 outputs an LO voltage (0 V in the embodiment), which is the preset voltage value, to the ECU 10 when the voltage signal S4d calculated by the average calculator 6 is lower than the threshold (constant), and ends the process (Step S218).

In Step S218, the ECU 10 continuously executes the above-described processing in Steps S201 to S217 at a predetermined period until the power of the internal combustion engine 100 is turned off.

Note that the description has been given in the above-described embodiment by exemplifying the case of correcting the gain and phase of the differential voltage S41b of the first crank angle sensor 1211 based on the differential voltage S42b of the second crank angle sensor 1212 when the high noise is included in the differential voltage S41b of the first crank angle sensor 1211, but the present invention is not limited thereto. For example, the gain and phase of the differential voltage S42b of the second crank angle sensor 1212 may be corrected based on the differential voltage S41b of the first crank angle sensor 1211 when the high noise is included in the differential voltage S42b of the second crank angle sensor 1212.

As described above, in the second embodiment, (6) it is configured such that the noise detector that detects the noise of at least any one of the differential signal S41b based on the first output signal S41 and the differential signal S42b based on the second output signal 42 is provided, and the gain corrector 4 and the phase corrector 5 correct the output signal having the higher noise based on the output signal having the lower noise detected by the noise detector between the differential signal S41b and the differential signal S42b.

With this configuration, the noise of the differential signal S41b of the first crank angle sensor 1211 and the noise of the differential signal S42b of the second crank angle sensor 1212 can be detected. For example, when the noise of the differential voltage S41b of the first crank angle sensor 1211 is high, the gain and phase of the differential voltage S41b of the first crank angle sensor 1211 are adjusted based on the differential voltage S42b of the second crank angle sensor 1212, so that a crank angle can be accurately detected.

Third Embodiment

Next, an angle detection device 1B according to a third embodiment of the present invention will be described.

The description has been given in the above-described embodiment by exemplifying the case where at least one differential voltage with the lower noise of the first crank angle sensor 1211 and the second crank angle sensor 1212 is used as the reference to correct the gain and phase of the other differential voltage. However, the angle detection device 1B according to the third embodiment can reduce the influence of a noise by storing a plurality of differential voltages in a memory such as the RAM 14 of the ECU 10 and averaging the plurality of stored differential voltages as a countermeasure for the case where all differential voltages include a high noise, which is a difference from the above-described embodiment.

Figure 7:
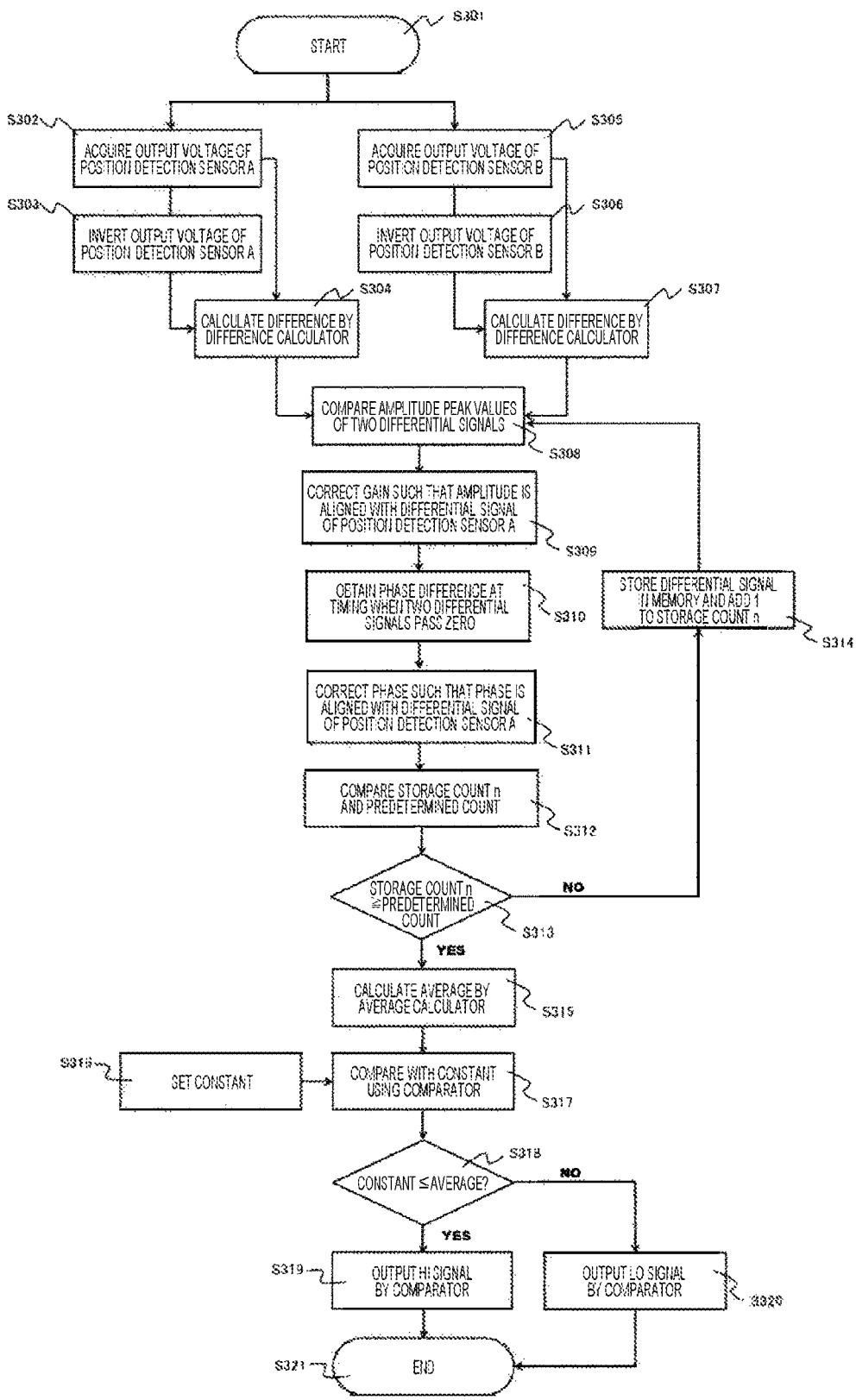
FIG. 7 is a flowchart of a method for detecting an angle of a crankshaft using an angle detection device according to a third embodiment.

FIG. 7 is a flowchart of a method for detecting an angle of the crankshaft 123 using the angle detection device 1B according to the third embodiment. Note that the same configurations as those in the above-described embodiment are denoted by the same reference signs, and will be described as needed.

As illustrated in FIG. 7, Steps S301 to S311 are the same procedures as Steps S101 to S111 described above.

In Step S312, the angle detection device 1B determines whether a storage count n of storing the differential voltages S41b and S42b of the first crank angle sensor 1211 and the second crank angle sensor 1212 in the RAM 14 is equal to or more than a predetermined count set in advance. The predetermined count is set to the number of times that can minimize the influence of the included noise such that detection accuracy of a crank angle can be sufficiently secured by calculating an average value of the sum of differential voltages obtained for the predetermined count when the noise is included in the differential voltages S41b and S42b of the first crank angle sensor 1211 and the second crank angle sensor 1212.

In Step S313, the angle detection device 1B proceeds to Step S315 when determining that the storage count n exceeds the predetermined count (Step S313: YES). When determining that the storage count n is equal to or less than the predetermined count (Step S313: NO), the angle detection device 1B proceeds to Step S314 to store the differential signals S41c and S42c after the gain correction and the phase correction in the RAM 14 of the ECU 10 and add one to the storage count n, returns to Step S308, and then, repeats the processing in Steps S308 to S313 until the storage count n is equal to or less than the predetermined count.

In Step S315, the average calculator 6 divides the sum of voltage values of the corrected differential signals S41c of the first crank angle sensor 1211, obtained n times, and the corrected differential signals 42c of the second crank angle sensor 1212, obtained n times, by 2n to calculate the average value S4d. As a result, the calibration of the angle error including the manufacturing errors and mounting errors of the crank angle sensors 1211 and 1212 is completed.

In Step S316, the predetermined threshold (constant) Kth is preset in the comparator.

In Step S317, the comparator 7 compares the threshold (constant) Kth set in Step S316 and the voltage signal S4d calculated by the average calculator 6.

In Step S318, the comparator 7 proceeds to Step S319 when the voltage signal S4d calculated by the average calculator 6 is equal to or higher than the threshold (constant) Kth (Step S318: YES), and proceeds to Step S320 when the voltage signal S4d is lower than the threshold (constant) (Step S318: NO).

In Step S319, the comparator 7 outputs an HI voltage (5 V in the embodiment), which is the preset voltage value, to the ECU 10 when the voltage signal S4d calculated by the average calculator 6 is equal to or higher than the threshold (constant) Kth, and ends the process (Step S321).

In Step S320, the comparator 7 outputs an LO voltage (0 V in the embodiment), which is the preset voltage value, to the ECU 10 when the voltage signal S4d calculated by the average calculator 6 is lower than the threshold (constant), and ends the process (Step S321).

In Step S321, the ECU 10 continuously executes the above-described processing in Steps S301 to S320 at a predetermined period until the power of the internal combustion engine 100 is turned off.

As described above, in the third embodiment, (7) the RAM 14 (storage device), which stores a plurality of output signals whose phases have been corrected by the phase corrector of at least any one of the differential signals S41b based on the first output signal S41 of the first crank angle sensor 1211 and the differential signals S42b based on the second output signal S42 of the second crank angle sensor 1212, is provided, and the gain corrector 4 and the phase corrector 5 are configured to perform the correction based on the average value of the plurality of output signals stored in the storage device.

With this configuration, the angle detection device 1B can reduce the influence of the noise even when the noise is included in the output signal of the crank angle sensor by storing the plurality of differential signals S41b and S42b in the RAM 14 and averaging the plurality of stored differential signals.

Fourth Embodiment

Next, an angle detection device 1C according to a fourth embodiment of the present invention will be described.

The description has been given in the above-described embodiment by exemplifying the case where scale intervals of the ring gear 120 (scale plate) are equal pitches. However, when scale intervals of the ring gear 120 (scale plate) are unequal pitches, phases of waveforms of the differential signal S41b of the first crank angle sensor 1211 and the differential signal S42b of the second crank angle sensor 1212 become different phases for each crank angle, so that the phase correction using the phase corrector 5 becomes difficult. In the fourth embodiment, even in the case of the unequal pitches, the angle detection device 1C can accurately detect a crank angle by correcting the phase in consideration of the phases of the first crank angle sensor 1211 and the second crank angle sensor 1212, which is a difference from the above-described embodiment.

Figure 8:
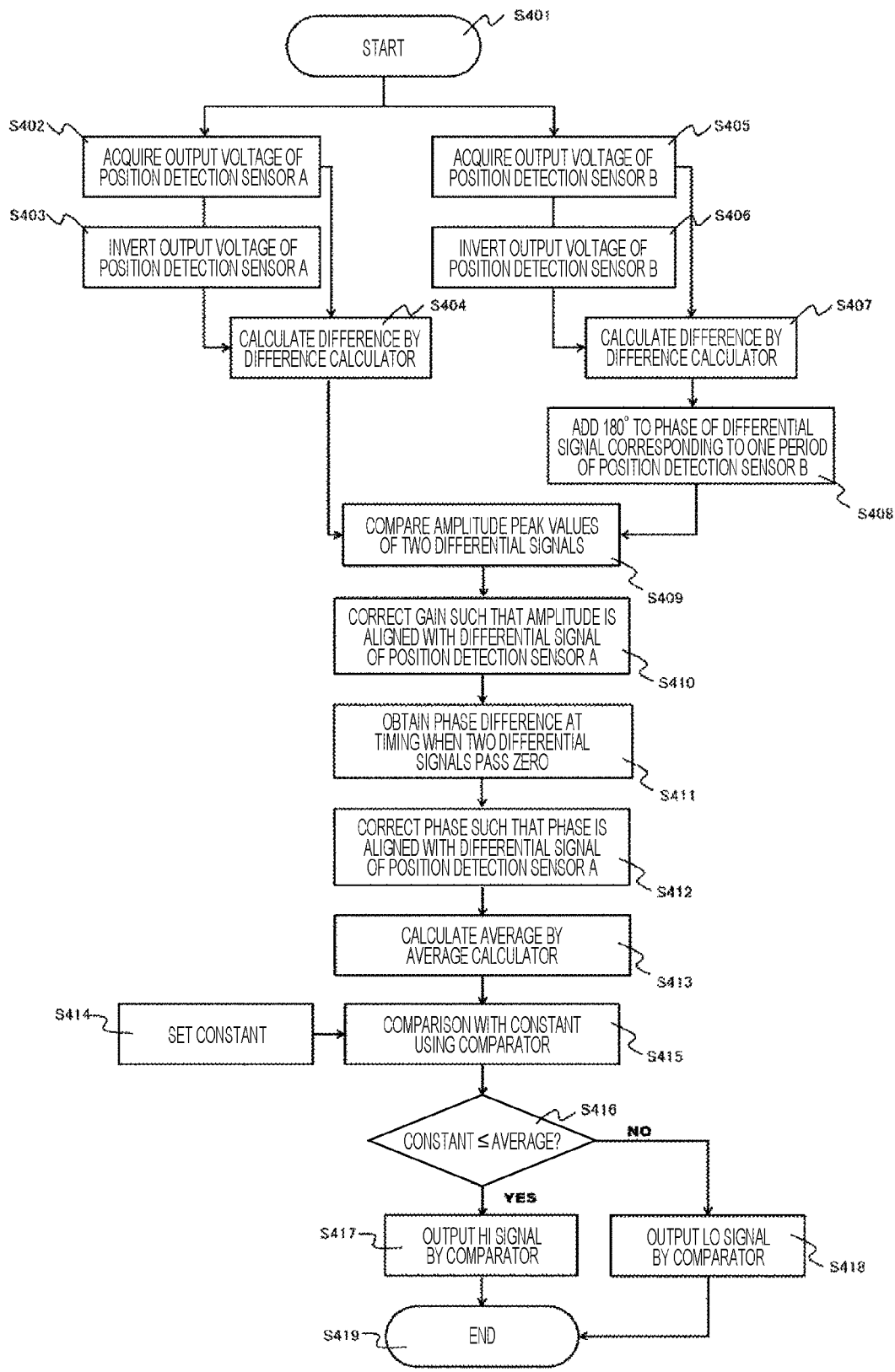
FIG. 8 is a flowchart of a method for detecting an angle of a crankshaft using an angle detection device according to a fourth embodiment.

FIG. 8 is a flowchart of a method for detecting an angle of the crankshaft 123 using the angle detection device 1C according to the fourth embodiment. Note that the same configurations as those in the above-described embodiment are denoted by the same reference signs, and will be described as needed.

As illustrated in FIG. 8, Steps S401 to S407 are the same procedures as Steps S101 to S107 described above.

In Step S408, the phase of the differential signal S42b of the second crank angle sensor 1212 is shifted by 180° by adding 180° to the phase of the differential signal S42b of the second crank angle sensor 1212 for one period, Note that the phase to be added is defined by a phase difference $\Delta\beta$ (mounting positions) between the first crank angle sensor 1211 and the second crank angle sensor 1212, and the case where 180° is added as the phase has been exemplified in the embodiment since the first crank angle sensor 1211 and the second crank angle sensor 1212 are arranged at positions different by 180° about the rotary shaft (the phase difference $\Delta\beta=180°$).

In Step S409, the gain corrector 4 compares the differential signal S41b of the first crank angle sensor 1211 and the differential signal S42b shifted by 180° of the second crank angle sensor 1212 which are calculated in Step S404. In the embodiment, the gain corrector 4 calculates the amplitude difference $\Delta y$ (yb ya) between the amplitude ya of the differential signal S41b and the amplitude yb of S42b at the timing when the differential signal S41b of the first crank angle sensor 1211 has the maximum value.

In Step S410, the gain corrector 4 corrects the gain G2 of the second crank angle sensor 1212 such that the maximum value of the differential signal S42b of the second crank angle sensor 1212 shifted by 180° is equal to the maximum value of the differential signal S41b of the first crank angle sensor 1211 at the timing of Step S409.

In Step S411, the phase corrector 5 calculates the phase difference $\Delta\alpha$ ($\alpha b-\alpha a$) between the phase $\alpha a$ of the differential signal S41b and the phase $\alpha b$ of the differential signal S42b shifted by 180° at a timing when the differential signal S41b of the first crank angle sensor 1211 is 0 (zero).

In Step S412, the phase corrector 5 corrects the phase of the differential signal S42b of the second crank angle sensor 1212 such that a timing when the differential signal S42b of the second crank angle sensor 1212 shifted by 180° becomes 0 (zero) is equal to a timing when the differential signal S41b of the first crank angle sensor 1211 becomes 0 (zero).

In Step S413, the average calculator 6 calculates the average value S4d by dividing the sum of the voltage values of the corrected differential signal S41c of the first crank angle sensor 1211 and the corrected differential signal S42c of the second crank angle sensor 1212 by two. As a result, the calibration of the angle error including the manufacturing errors and mounting errors of the crank angle sensors 1211 and 1212 is completed.

In Step S414, the predetermined threshold (constant) Kth is set in the comparator in advance.

In Step S415, the comparator 7 compares the threshold (constant) Kth set in Step S414 and the voltage signal S4d calculated by the average calculator 6.

In Step S416, the comparator 7 proceeds to Step S417 when the voltage signal S4d calculated by the average calculator 6 is equal to or higher than the threshold (constant) Kth (Step S416: YES), and proceeds to Step S418 when the voltage signal S4d is lower than the threshold (constant) (Step S416: NO).

In Step S417, the comparator 7 outputs an HI voltage (5 V in the embodiment), which is the preset voltage value, to the ECU 10 when the voltage signal S4d calculated by the average calculator 6 is equal to or higher than the threshold (constant) Kth, and ends the process (Step S419).

In Step S418, the comparator 7 outputs an LO voltage (0 V in the embodiment), which is the preset voltage value, to the ECU 10 when the voltage signal S4d calculated by the average calculator 6 is lower than the threshold (constant), and ends the process (Step S419).

In Step S419, the ECU 10 continuously executes the above-described processing in Steps S401 to S418 at a predetermined period until the power of the internal combustion engine 100 is turned off.

As described above, in the fourth embodiment, (8) the phase corrector 5 is configured to calculate the phase difference Δβ (180° in the embodiment) between the first crank angle sensor 1211 and the second crank angle sensor 1212 and to add the calculated phase difference Δβ (180° in the embodiment) to the phase of at least any one of the differential signal S41b based on the first output signal S41 and the differential signal S42b based on the second output signal S42.

With this configuration, even if the scale intervals of the ring gear 120 (scale plate) detected by the first crank angle sensor 1211 and the second crank angle sensor 1212 are unequal pitches, the influence of the unequal pitch can be canceled by adding the phase difference Δβ between the first crank angle sensor 1211 and the second crank angle sensor 1212 to either the differential signal S41b or the differential signal S42b, and the rotation angle of the crankshaft 123 can be measured accurately.

Note that it is difficult to calibrate the crank angle sensor according to the above-described embodiment under a situation where rotation variations are included in output signals of the first crank angle sensor 1211 and the second crank angle sensor 1212, and thus, it is necessary to separate misalignment on a sensor head side or individual sensitivity differences from the rotation variations.

As a separation method, it is conceivable to calibrate the crank angle sensor under a situation where the rotation variation is small, such as during motoring from the outside or coasting.

As an example, (a) motoring is performed with constant-speed rotation to calibrate the crank angle sensor at the time of factory shipment or dealer maintenance.

(b) In the case of a series hybrid vehicle, a range extender EV, or the like, motoring is performed with constant-speed rotation to calibrate the sensor when the vehicle stops.

(c) An in-cylinder pressure during cranking is recorded in advance, and calibration is performed after correcting rotation variations during the cranking.

(d) During deceleration at the time of fuel cut, calibration is performed after correcting the rotation variations with an assumed in-cylinder pressure at the time of deceleration.

In addition, a method of using a high-precision sensor such as a CPS (in-cylinder pressure sensor) as a calibration sensor to remove a rotation variation element and calibrate the crank angle sensor is conceivable. In this case, the CPS is mounted on one cylinder or a plurality of cylinders to be used for correction. It is desirable to calibrate the crank angle sensor after removing the influence of the rotation variations using these methods.

As described above, examples of the embodiments of the present invention have been described. However, the present invention may combine all the above-described embodiments, or preferably combines any two or more embodiments in random.

In addition, the present invention is not limited to one having all the configurations of the embodiments described above. Some configurations of the embodiment described above may be replaced with configurations of another embodiment, and further, the configurations of the embodiment described above may be replaced with configurations of another embodiment.

In addition, some configurations of the embodiment described above may be added to, deleted from, or replaced with configurations of another embodiment.

REFERENCE SIGNS LIST 1 angle detection device
2 (2A, 2B) inverter
3 (3A, 3B) difference calculator
4 gain corrector
5 phase corrector
6 average calculator
7 comparator
10 ECU
11 analog input unit
12 digital input unit
13 A/D converter
14 RAM
15 MPU
16 ROM
17 I/O port
18 output circuit
181 overall control unit
182 fuel injection control unit
183 ignition control unit
184 cylinder discrimination unit
185 angle information generation unit
186 rotation speed information generation unit
187 intake air quantity measurement unit
188 load information generation unit
189 water temperature measurement unit
100 internal combustion engine
110 air cleaner
111 intake pipe
112 intake manifold
113 throttle valve
113a throttle opening sensor
114 flow sensor
115 intake air temperature sensor
120 ring gear
1211 first crank angle sensor
1212 second crank angle sensor
122 water temperature sensor
123 crankshaft
125 accelerator pedal
126 accelerator position sensor
130 fuel tank
131 fuel pump, pressure regulator
133 fuel pipe
134 fuel injection valve
140 combustion pressure sensor
150 cylinder
160 exhaust manifold
161 three-way catalyst
162 upstream air-fuel ratio sensor 163 downstream air-fuel ratio sensor
200 ignition plug
300 ignition coil
piston 170

The invention claimed is:

1. An angle detection device, configured to detect a rotation angle of a rotary shaft using a first position sensor configured to detect the rotation angle of the rotary shaft and using a second position sensor configured to detect the rotation angle of the rotary shaft at a position different from the first position sensor, the angle detection device comprising:
a gain corrector configured to correct a gain of at least any one of the first position sensor or the second position sensor such that an amplitude of a first output signal of the first position sensor is equal to an amplitude of a second output signal of the second position sensor;
a phase corrector configured to correct at least any one of a phase of the first output signal or a phase of the second output signal such that the phase of the first output signal is equal to the phase of the second output signal;
inverters configured to invert and output the first output signal and the second output signal, respectively; and
difference calculators configured to calculate a difference between output signals before and after the inversion of the first output signal and a difference between output signals before and after the inversion of the second output signal, the inversion performed by the inverters.

2. The angle detection device according to claim 1, wherein the gain corrector is configured to correct the gain of at least any one of the first position sensor or the second position sensor such that the amplitude of the first output signal is equal to the amplitude of the second output signal at a timing when any one of the amplitude of the first output signal or the amplitude of the second output signal reaches a maximum value.

3. The angle detection device according to claim 1, wherein the phase corrector is configured to calculate a phase difference between the first output signal and the second output signal at a timing when any one of the first output signal or the second output signal becomes zero, and correct the phase of at least any one of the first output signal or the second output signal such that a timing when the first output signal becomes zero is equal to a timing when the second output signal becomes zero.

4. The angle detection device according to claim 1, further comprising
a noise detector configured to detect a noise of at least any one of the first output signal or the second output signal,
wherein the gain corrector and the phase corrector are configured to correct an output signal having a higher noise based on an output signal having a lower noise detected by the noise detector between the first output signal and the second output signal.

5. The angle detection device according to claim 1, wherein the phase corrector is configured to calculate a phase difference between the first output signal and the second output signal, and add the calculated phase difference to the phase of at least any one of the first output signal or the second output signal.

6. An angle detection device, configured to detect a rotation angle of a rotary shaft using a first position sensor configured to detect a rotation angle of the rotary shaft and using a second position sensor configured to detect the rotation angle of the rotary shaft at a position different from the first position sensor, the angle detection device comprising:
a gain corrector configured to correct a gain of at least any one of the first position sensor or the second position sensor such that an amplitude of a first output signal of the first position sensor is equal to an amplitude of a second output signal of the second position sensor;
a phase corrector configured to correct at least any one of a phase of the first output signal or a phase of the second output signal such that the phase of the first output signal is equal to the phase of the second output signal;
an average calculator configured to calculate an average value of a corrected output signal of the first output signal and a corrected output signal of the second output signal which are obtained by the phase corrector; and
a comparator configured to compare the average value calculated by the average calculator and a predetermined threshold and to output a result of the comparison.

7. An angle detection device, configured to detect a rotation angle of a rotary shaft using a first position sensor configured to detect a rotation angle of the rotary shaft and using a second position sensor configured to detect the rotation angle of the rotary shaft at a position different from the first position sensor, the angle detection device comprising:
a gain corrector configured to correct a gain of at least any one of the first position sensor or the second position sensor such that an amplitude of a first output signal of the first position sensor is equal to an amplitude of a second output signal of the second position sensor;
a phase corrector configured to correct at least any one of a phase of the first output signal or a phase of the second output signal such that the phase of the first output signal is equal to the phase of the second output signal;
a storage device configured to store a plurality of output signals whose phases have been corrected by the phase corrector of at least any one of the first output signal or the second output signal,
wherein the gain corrector and the phase corrector are configured to perform correction based on an average value of the plurality of output signals stored in the storage device.

8. An angle detection method for detecting a rotation angle of a rotary shaft using a first position sensor configured to detect the rotation angle of the rotary shaft and using a second position sensor configured to detect the rotation angle of the rotary shaft at a position different from the first position sensor, the angle detection method comprising:
correcting a gain of at least any one of the first position sensor or the second position sensor such that an amplitude of a first output signal of the first position sensor is equal to an amplitude of a second output signal of the second position sensor;
correcting at least any one of a phase of the first output signal or a phase of the second output signal such that the phase of the first output signal is equal to the phase of the second output signal,
wherein in the gain correction step, the gain of at least any one of the first position sensor or the second position sensor is corrected such that the amplitude of the first output signal is equal to the amplitude of the second output signal at a timing when any one of the amplitude of the first output signal or the amplitude of the second output signal reaches a maximum value; and detecting a noise of at least any one of the first output signal or the second output signal, wherein, in the gain correction and the phase correction, an output signal having a higher noise is corrected based on an output signal having a lower noise detected in the noise detection between the first output signal and the second output signal.

9. The angle detection method according to claim 8, wherein in the phase correction, a phase difference between the first output signal and the second output signal is calculated at a timing when any one of the first output signal or the second output signal becomes zero, and the phase of at least any one of the first output signal or the second output signal is corrected such that a timing when the first output signal becomes zero is equal to a timing when the second output signal becomes zero.

10. The angle detection method according to claim 9, further comprising:

storing a plurality of output signals whose phases have been corrected in the phase correction of at least any one of the first output signal or the second output signal, wherein, in the gain correction and the phase correction, correction is performed based on an average value of the plurality of output signals stored in the storage.

\* \* \* \* \*